United States Patent Office 3,362,977
Patented Jan. 9, 1968

3,362,977
METHOD FOR MAKING ORGANOSILANES
Abe Berger, Schenectady, N.Y., assignor to General
Electric Company, a corporation of New York
No Drawing. Filed Mar. 27, 1964, Ser. No. 355,464
7 Claims. (Cl. 260—448.2)

ABSTRACT OF THE DISCLOSURE

A redistribution method for partially reducing alkylhalosilane utilizing alkylsilane having three hydrogen atoms attached to silicon by exchanging hydrogen atoms of the alkylsilane for halogen atoms of the alkylhalosilane. The alkylsilane is added in the presence of a Lewis acid catalyst to the alkylhalosilane while it is refluxing. Hydrogenated alkylhalosilane thereafter can be separated as an overhead product, while halogenated alkylsilane can be recovered from the resulting mixture free of alkyltrihalosilane.

---

The present invention relates to a method for making certain alkylhalosilanes. More particularly, the present invention relates to a method which comprises reacting alkylsilane and halosilane in the presence of a Lewis acid catalyst and recovering a bottoms product of partially halogenated alkylsilane.

It is generally known by those skilled in the art that alkylhalosilane of the formula, (1)  $H(CH_2)_aSiHZX$ where X is a halogen radical, Z is a hydrogen or a halogen radical, and $a$ is an integer equal to from 3 to 20, inclusive, can be used to make a variety of organosilicon compositions exhibiting valuable hydrophobic properties. Such compositions for example, are eminently suitable for treating fabrics, paper and masonry, for making organosilicon materials useful for rendering substrates water repellent as well as paintable, etc. In addition, because these silanes have hydrogen as well as halogen atoms attached to silicon, they can be utilized for making hydrolyzable silanes substituted with two or more of the same or different monovalent hydrocarbon radicals Alkylhalosilanes included by Formula 1 are, for example, propyldichlorosilane, butylchlorosilane, isobutyldichlorosilane, amyldichlorosilane, hexylchlorosilane, dodecylchlorosilane, tetradecyldichlorosilane, etc.

Prior to the present invention, one method that was employed to make alkylhalosilane of Formula 1 was by reacting an alkyl Grignard and a trihalosilane. Another procedure used was reacting alkylsilane and a stoichiometric amount of a metallic halogenating agent, such as mercuric chloride. An additional method employed was redistributing chemically combined hydrogen from triorganosilane to alkyltrihalosilane. Although all of the procedures of the prior art have provided effective ways for making alkylhalosilane included by Formula 1, these procedures have not been utilized extensively for producing these materials in commercial quantities. It is well known, for example, that the use of Grignard reagents requires the employment of expensive materials, and invariably results in the production of a mixture of products. Direct halogenation of alkylsilanes by the use of metallic salts, such as mercuric chloride also is undesirable for producing alkylhalosilanes of Formula 1; there is a considerable loss of chemically combined hydrogen which is evolved during the reaction as hydrogen chloride. In addition, presently known redistribution methods for making alkylhalosilanes of Formula 1, involving the employment of triorganosilane as a hydrogen source invariably result in the production of a number of undesirable products.

The present invention is based on the discovery that if an alkylsilane having the formula, (2) $H(CH_2)_aSiH_3$ is reacted in the presence of a Lewis acid catalyst with a halosilane selected from, (3)  $[H(CH_2)_b]_x[H(CH_2)_c]_ySi(H)_dX_e$ (4) 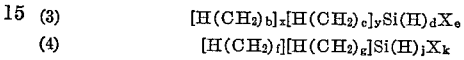 $[H(CH_2)_f][H(CH_2)_g]Si(H)_jX_k$ and mixtures thereof, no more than two of the three available hydrogen atoms of the alkylsilane of (2) readily react, resulting in quantitative yields of the alkylhalosilane of Formula 1, where $a$ is defined in Formula 1, $b$ is an integer equal to 1 or 2, $c$ is an integer equal to 1 to 18, inclusive, $f$ is an integer equal to 3 to 16, inclusive, $g$ is an integer equal to 3 to 16, inclusive, $x$ is an integer equal to 1 to 3, inclusive, $y$ is a whole number equal to 0 or 1, and $a$, which equals the number of carbon atoms in the alkylsilane of Formula 2, is greater than $bx$, or $bx+c$, the number of carbon atoms in the silane of Formula 3, or $f+g$, the number of carbon atoms in the silane of Formula 4, $d$ is a whole number equal to 0 to 2, inclusive, $e$ is an integer equal to 1 to 3, inclusive, $j$ is a whole number equal to 0 or 1, $k$ is an integer equal to 1 or 2, the sum of $x$, $y$, $d$ and $e$ is equal to 4, and the sum of $j$ and $k$ is equal to 2.

A significant feature of the present invention is that when the alkylsilane of Formula 2 is halogenated with excess halosilane of Formula 3, or 4, only two out of the three possible hydrogen atoms of the alkylsilane readily react. As a result, mixtures can be produced from the reaction of alkylsilane of Formula 2, in accordance with the practice of the present invention which are free of the corresponding alkyltrihalosilane. An added separation procedure is thus avoided. Those skilled in the art know this result is quite surprising since hydrogen atoms attached to silicon are generally equivalent with respect to the manner by which they react such as hydrolysis, halogenation, alcoholysis, etc.

In accordance with the present invention, there is provided a method involving reaction between an alkyl silane of Formula 2, and a halosilane selected from Formula 3, Formula 4, or mixtures thereof, which comprises (1) reacting at least about 0.5 mole of said halosilane, per mole of said alkylsilane, to provide for in the resulting reaction mixture at least about two atoms of halogen chemically bonded to silicon per mole of said alkylsilane, in the presence of an effective amount of Lewis acid catalyst, (2) stripping (1) to effect the separation therefrom of volatile reaction products, and (3) recovering from (2), a mixture consisting essentially of alkylhalosilane, alkyldihalosilane, and mixtures thereof, included by Formula 1.

Halosilanes included by Formula 3, are for example, methyltrichlorosilane, ethyltrichlorosilane, dimethyldichlorosilane, methylethyldichlorosilane, methylpropyldichlorosilane, dimethylchlorosilane, methyloctyldichlorosilane, ethyldodecylchlorosilane, methyldichlorosilane, ethyldichlorosilane, etc. Halosilanes included by Formula 4 are for example, dipropyldichlorosilane, butyldodecyldichlorosilane, dioctylchlorosilane, dihexadecyldichlorosilane, butyltetradecylchlorosilane, butyldecyldichlorosilane, dipentylchlorosilane, dipropylchlorosilane, isobutylpropylchlorosilane, etc.

Preferably, aluminum chloride is utilized to effect reaction between the alkylsilane of Formula 2 and the halosilane of Formula 3 or 4, in the practice of the method of the present invention. However, other Lewis acid catalysts can be satisfactorily employed as N,N'-dimethylcyanamide, $BCl_3$, etc. An effective amount of catalyst is at least that amount of catalyst which is dissolved by halosilane utilized in the reaction mixture, after it has been heated to reflux in the presence of excess catalyst, allowed to cool, and filtered. Amounts of catalyst up to 10% by weight of the mixture, or higher, also can be employed if desired.

Alkylsilanes shown by Formula 2 include for example, propyl silane, butyl silane, pentylsilane, hexyl silane, heptyl silane, octylsilane, isobutyl silane, decyl silane, undecyl silane, dodecyl silane, tridecyl silane, tetradecyl silane, pentadecyl silane, hexadecyl silane, heptadecyl silane, octadecyl silane, nonadecyl silane, and eicosanyl silane. Methods for making the silanes of Formula 2 are well known and include for example, the reduction of the corresponding trihalosilane having the formula, (5) $\qquad H(CH_2)_aSiX_3$ by conventional methods, where $a$ and $X$ are as defined above. For example, lithium hydride and boiling dioxane can be employed. Ringwald Patent 3,050,366 teaches that a mixture of sodium hydride and an ether solvent can be utilized for substituting hydrogen for silicon-bonded halogen atoms in a halogen substituted silane. Activated aluminum and hydrogen gas is also operable. Lithium aluminum hydride has also been utilized by those skilled in the art for substituting hydrogen atoms for silicon-bonded halogen atoms. Other methods that can be employed for effecting the reduction of the alkyltrihalosilanes of Formula 5 to the corresponding silanes are taught by Jenker, Patents 3,043,857 and 3,100,788.

In the practice of the invention, a mixture of alkylsilane of Formula 2, and halosilane of Formulae 3 or 4, is allowed to react in the presence of a Lewis acid catalyst, and a redistribution product of reaction produced from the halosilane is separated overhead from the resulting reaction mixture.

Experience has shown that when the reaction is conducted under reflux conditions, alkyldihalosilane (6) $\qquad H(CH_2)_aSiHX_2$ is produced in quantitative yields, where $a$ and $X$ are as defined above. Under these conditions, it is preferred to add the alkylsilane to a mixture of the Lewis acid catalyst and refluxing halosilane. At temperatures between 20° C. to 30° C. in the presence of excess alkylsilane, that is amounts of up to about equal moles of alkylsilane and halosilane, a mixture of alkylhalosilane can be produced having a major amount of alkylhalosilane of the formula, (7) $\qquad H(CH_2)_aSiH_2X$ where $a$ and $X$ are as previously defined.

In order to achieve effective results, experience has shown that the halosilane should be utilized in the reaction mixture in an amount sufficient to provide for at least 2 silicon-bonded halogen atoms per mole of the alkyl silane. A proportion of at least about 0.5 mole to as high as 10 moles of halosilane or higher, per mole of alkyl silane under most circumstances will be operable. Temperatures in the range of from 0° C. to reflux can be employed, while a temperature between 20° C. to 50° C. is preferred.

Reaction times will vary widely depending upon the reactants and the conditions utilized during the reaction. For example, in most instances, the redistribution reaction will be completed after about 1 to 5 hours. However, under particular situations reaction can be completed in more or less time.

When practicing the invention under reflux conditions, continuous separation of volatile halosilane products of reduction as an overhead fraction can be readily achieved. At the termination of the reaction, excess catalyst can be removed from the reaction mixture by filtration, etc. before the alkylhalosilane is recovered. In instances where the invention is practiced below reflux temperatures, silane reaction products can be separated from catalyst residues by flash distilling the reaction mixture under reduced pressures. The separation of volatile halosilane products of reduction can be achieved readily by distillation. If desired, the reaction mixture can be distilled to effect separation of volatile halosilane reduction products in the presence of catalyst residues.

In order that those skilled in the art will be better able to practice the invention, the following examples are given by way of illustration and not by way of limitation. All parts are by weight.

*Example 1*

There were added 21 parts of amylsilane to a mixture at reflux, of 194 parts of dimethyldichlorosilane and 9.7 parts of aluminum chloride. During the addition of the amylsilane, a fraction consisting essentially of dimethylchlorosilane was continuously collected at 34–36° C., as an overhead product. After a period of about 3 hours, a sample of the reaction mixture was examined by vapor phase chromatography. It showed that the reaction mixture was free of amyltrichlorosilane. The mixture was filtered to remove excess aluminum chloride and then distilled. A fraction boiling between 138° C. to 141° C. was collected. There was obtained an 83% yield of amyldichlorosilane based on the weight of the starting amylsilane. The identity of the amyldichlorosilane was confirmed by titrating it for hydrolyzable chloride with a standard KOH solution: Theor: 41.52. Found: 40.36. In addition its identity was further confirmed by its infrared spectrum.

*Example 2*

There were added to a refluxing mixture of 60 parts of methyldichlorosilane and 6 parts of aluminum chloride, 10.2 parts of amylsilane. After a period of about ½ hour, a volatile product started to evolve. When volatile products were no longer evolved, the reaction mixture was cooled; the $AlCl_3$ was removed by filtration. The resulting mixture was found to be free of amyltrichlorosilane, based on its infrared spectrum. It was fractionated; there were obtained 15.2 parts of amyldichlorosilane.

*Example 3*

There were added 22.8 parts of tetradecylsilane to a refluxing mixture of 77.4 parts of dimethyldichlorosilane and 7 parts of anhydrous aluminum chloride. During the addition, a volatile reaction product was continuously evolved at a temperature between 30° C.–35° C. The mixture was refluxed continuously after the addition until no further volatile products evolved. The mixture was then filtered and flash distilled. It was examined by infrared; it was found to be free of tetradecyltrichlorosilane. There was obtained an 83% yield of product boiling at 140° C. to 145° C. at 46 mm. The product was identified as tetradecyldichlorosilane based on its hydrolyzable chloride and its infrared spectrum.

*Example 4*

There were added 9 parts of n-propyl silane to a mixture consisting of 51.6 parts dimethyldichlorosilane and 5 parts of aluminum chloride. The reaction mixture was continuously stirred for 5 hours at room temperature. A Dry Ice condenser was present to prevent the escape of any low boilers. The mixture was then heated, and volatile products boiling between 30° C.–35° C. were continuously removed. After there was no further evolution of volatile products, the mixture was cooled; aluminum chloride was separated by filtration. The resulting supernatent liquid was fractionated. A 65% yield of a product was obtained boiling between 100° C. to 102° C. The product was identified as n-propyldichlorosilane, based on its hydrolyzable chloride and its infrared spectrum. The rest of the mixture was found to consist essentially of n-propylchlorosilane and n-propylsilane.

*Example 5*

There were added 11.6 parts of hexylsilane to a refluxing mixture of 77.4 parts of dimethyldichlorosilane and 7 parts of anhydrous aluminum chloride. During the addition, volatile reaction products were continuously evolved. At the completion of the reaction, the mixture was cooled; the aluminum chloride was removed by filtration. The resulting mixture was free of hexyltrichlorosilane based on its infrared spectrum. Upon fractionating the mixture, there were obtained 15 parts of product having a boiling range between 170° C.–175° C. Based on its percent by weight of hydrolyzable chloride, as determined by titrating with a standard KOH solution, the product was hexyldichlorosilane. Its identity was further confirmed by its infrared spectrum.

*Example 6*

There were added 10.4 parts of amylsilane to a mixture at reflux consisting of 74 parts methyltrichlorosilane, 12.9 parts dimethyldichlorosilane and 8 parts of aluminum chloride. During the addition, volatile material was continuously evolved. After 3 hours refluxing, the mixture was filtered. The mixture was found to be free of amyltrichlorosilane, based on its infrared spectrum. The mixture was fractionated and there was obtained a 95% yield of amyldichlorosilane.

*Example 7*

A mixture of 332 parts of dimethyldichlorosilane and 25 parts of aluminum chloride were stirred and heated to reflux. The mixture was then cooled to room temperature and filtered. There were added at room temperature (25° C.), 26 parts of amylsilane to 217 parts of the resulting mixture of dimethyldichlorosilane and aluminum chloride. The mixture was stirred at room temperature for a period of 2 hours and it was examined by vapor phase chromatography. It showed the following:

*Reaction mixture after 2 hrs. at room temperature*

| Silane: | Wt. percent |
|---|---|
| $(CH_3)_2SiHCl$ | 10.2 |
| $C_5H_{11}SiH_3$ | 1.2 |
| $(CH_3)_2SiCl_2$ | 71.3 |
| $C_5H_{11}SiClH_2$ | 6.6 |
| $C_5H_{11}SiCl_2H$ | 10.7 |

The mixture was then allowed to stir for an additional 24 hours at room temperature. Vapor phase chromatography showed the following:

*Reaction mixture after 24 hrs. at room temperature*

| Silane: | Wt. percent |
|---|---|
| $(CH_3)_2SiHCl$ | 9.9 |
| $C_5H_{11}SiH_3$ | 1.2 |
| $(CH_3)_2SiCl_2$ | 71.3 |
| $C_5H_{11}SiClH_2$ | 6.6 |
| $C_5H_{11}SiCl_2H$ | 10.7 |

The reaction mixture was then flash distilled under reduced pressure at room temperature. The resulting distillate was fractionated. There were obtained about 19 parts of a mixture of amylsilane consisting by weight of about 66% of amyldichlorosilane, about 30% of amylchlorosilane, and about 5% of amylsilane.

Based on the above results, those skilled in the art would know that the present invention provides for an improved process for making alkyl halosilanes of Formula 1. In addition, the present invention also provides for a convenient method for redistributing hydrogen atoms and halogen atoms on volatile alkylhalosilanes which provides for the production of a variety of valuable alkyl silanes as well as alkylhalosilanes, such as dimethylchlorosilane, diethylchlorosilane, propylchlorosilane, dibutylchlorosilane, etc.

While the foregoing examples have of necessity been limited to only a few of the very many variables within the scope of the present invention, it should be understood that the present invention is directed to the production of a much broader class of alkylhalosilanes as shown by Formula 1, that can be made by reacting alkylsilanes of Formula 2, and halosilanes of Formula 3 in the presence of a Lewis acid catalyst. In addition, the present invention also provides for the production of a broad class of alkylsilanes and alkylhalosilanes which can be formed from halosilanes of Formula 3, Formula 4, or mixtures thereof, resulting from reaction with alkylsilanes of Formula 2.

What I claim as new and desire to secure by Letters Patent of the United States is:

1. A method which comprises (1) adding an alkylsilane of the formula, $$H(CH_2)_aSiH_3$$

to a halosilane while it is refluxing selected from the class consisting of, (I)                $[H(CH_2)_b]_x[H(CH_2)_c]_ySi(H)_dX_e$ (II)             $[H(CH_2)_f][H(CH_2)_g]Si(H)_jX_k$ (III)            and mixtures of (I) and (II)

in the presence of an effective amount of a Lewis acid catalyst, (2) separating partially reduced halosilane from the resulting mixture of (1), and (3) recovering from the resulting mixture of (2), an alkylhalosilane of the formula, $$H(CH_2)_aSiHZX$$

where X is a halogen radical, Z is a member selected from the class consisting of H and X, $a$ is an integer equal to from 3 to 20 inclusive, $b$ is an integer equal to 1 or 2, $c$ is an integer equal to 1 to 18 inclusive, $f$ is an integer equal to 3 to 16, inclusive, $g$ is an integer equal to 3 to 16, inclusive, $x$ is an integer equal to 1 to 3, inclusive, $y$ is a whole number equal to 0 to 1, $a$ has a value greater than the number of carbon atoms in the refluxing halosilane to which the alkylsilane is added, $d$ is a whole number equal to 0 to 2, inclusive, $e$ is an integer equal to 1 to 3, inclusive, $j$ is a whole number equal to 0 or 1, $k$ is an integer equal to 1 or 2, the sum of $x$, $y$, $d$ and $e$ is equal to 4, and the sum of $j$ and $k$ is equal to 2.

2. The method of claim 1 where the halosilane has the formula, $$[H(CH_2)_b]_x[H(CH_2)_c]_ySi(H)_dX_e$$

3. A method in accordance with claim 1, where the halosilane has the formula, $$[H(CH_2)_f][H(CH_2)_g]Si(H)_jX_k$$

4. A method in accordance with claim 1, in which said halosilane and said alkylsilane is reacted at temperatures from 0° C. to 50° C.

5. A method in accordance with claim 2 in which said halosilane is dimethyldichlorosilane.

6. A method which comprises (1) adding under reflux conditions, amylsilane to diethyldichlorosilane in the presence of an effective amount of aluminum chloride, to provide for in the resulting reaction mixture for at least 2 atoms of chemically bonded chlorine of said dimethyldichlorosilane, per mole of said amylsilane, (2) effecting the separation of dimethylchlorosilane from the resulting mixture of (1), and recovering from the resulting mixture of (2), a mixture consisting essentially of amylchlorosilane and amyldichlorosilane.

7. A method which comprises (1) adding under reflux conditions hexylsilane to dimethyldichlorosilane in the presence of an effective amount of aluminum chloride, to provide for in the resulting reaction mixture for at least 2 atoms of chemically-bonded chlorine of said dimethyldichlorosilane, per mole of said hexylsilane, (2) effecting the separation of dimethylchlorosilane from the resulting mixture of (1), and recovering from the resulting mixture of (2), a mixture consisting essentially of hexylchlorosilane and hexyldichlorosilane.

References Cited

UNITED STATES PATENTS 2,746,981 5/1956 Wagner et al. _____ 260—448.2
2,902,506 9/1959 Gilbert et al. _____ 260—448.2

HELEN M. McCARTHY, *Primary Examiner.*

TOBIAS E. LEVOW, *Examiner.*

J. PODGORSKI, *Assistant Examiner.*